United States Patent [19]

Hubbard et al.

[11] Patent Number: 4,848,492

[45] Date of Patent: Jul. 18, 1989

[54] TRANSPORTING AND DRIVE MECHANISM FOR A WEIGHING SCALE

[75] Inventors: David W. Hubbard, Stamford; Joseph R. Kocot, Danbury, both of Conn.

[73] Assignee: Pitney Bowes Inc., Stamford, Conn.

[21] Appl. No.: 141,442

[22] Filed: Jan. 7, 1988

[51] Int. Cl.[4] .......................... G01G 3/14; G01G 19/00
[52] U.S. Cl. ................................ 177/210 FP; 177/145
[58] Field of Search ........................... 177/145, 210 FP

[56] References Cited

U.S. PATENT DOCUMENTS 4,049,068 9/1977 Kavanagh et al. .................. 177/145
4,158,395 6/1979 Brown ........................... 177/210 FP Primary Examiner—George H. Miller, Jr.
Attorney, Agent, or Firm—Peter Vrahotes; Melvin J. Scolnick; David E. Pitchenik

[57] ABSTRACT

Transport and drive apparatus and method for use in determining the weight of an article. An article whose mass is to be determined is transported upon the plan of a weighing scale by a combination of rollers attached to the tray and drive rollers received within an opening of the tray. A reversible motor is used to provide drive to a conveyor rollers for transporting mail pieces onto the tray and for withdrawing the rollers upon reverse drive for purposes of weighing.

9 Claims, 10 Drawing Sheets

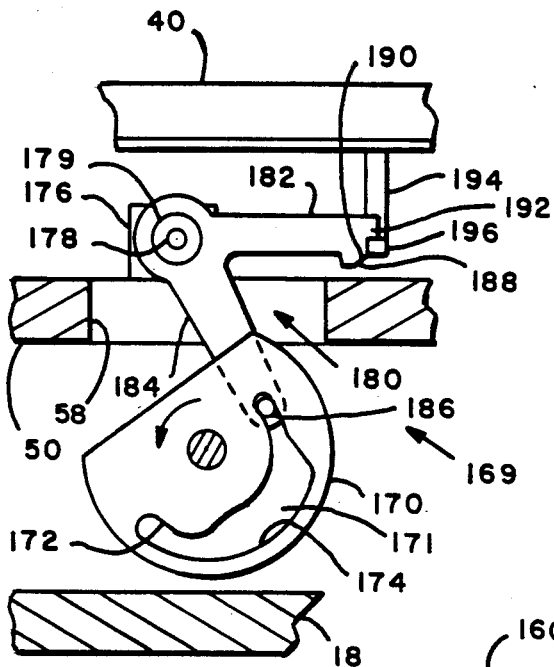
FIG. 9A
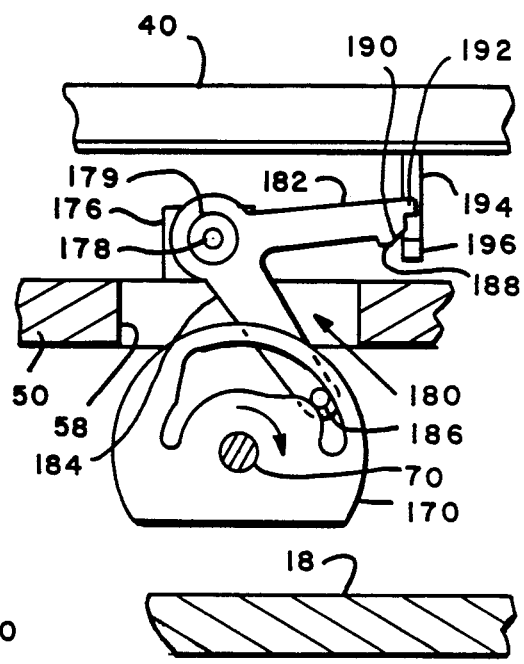
FIG. 9B
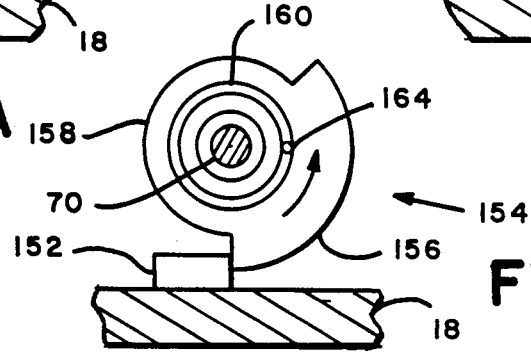
FIG. 7
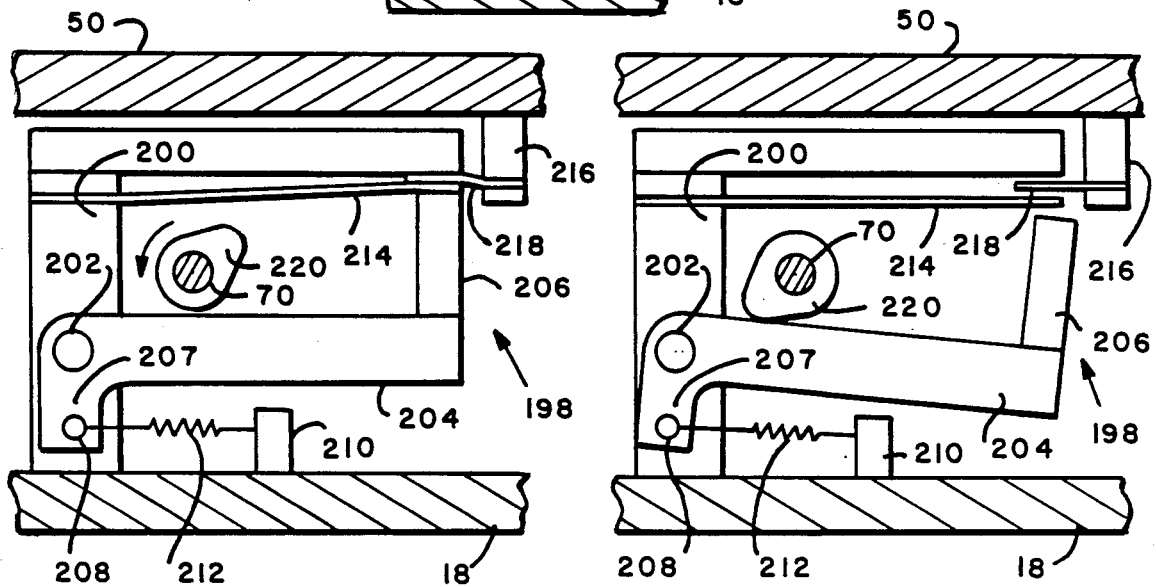
FIG. 10A
FIG. 10B

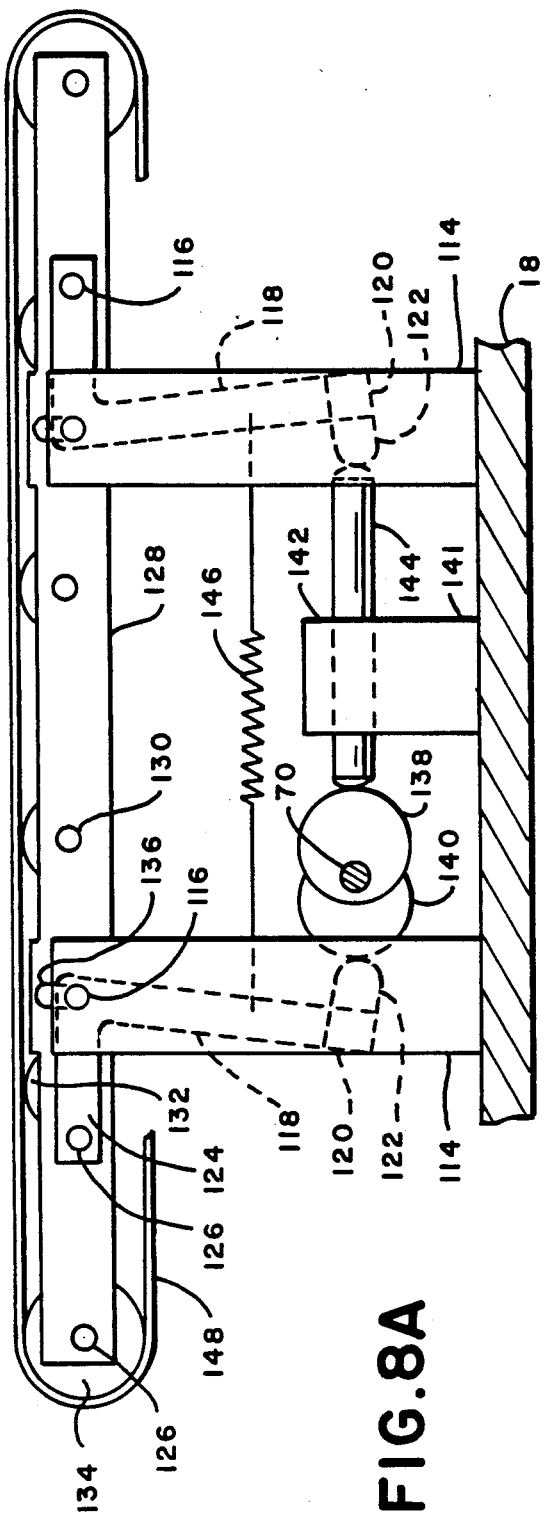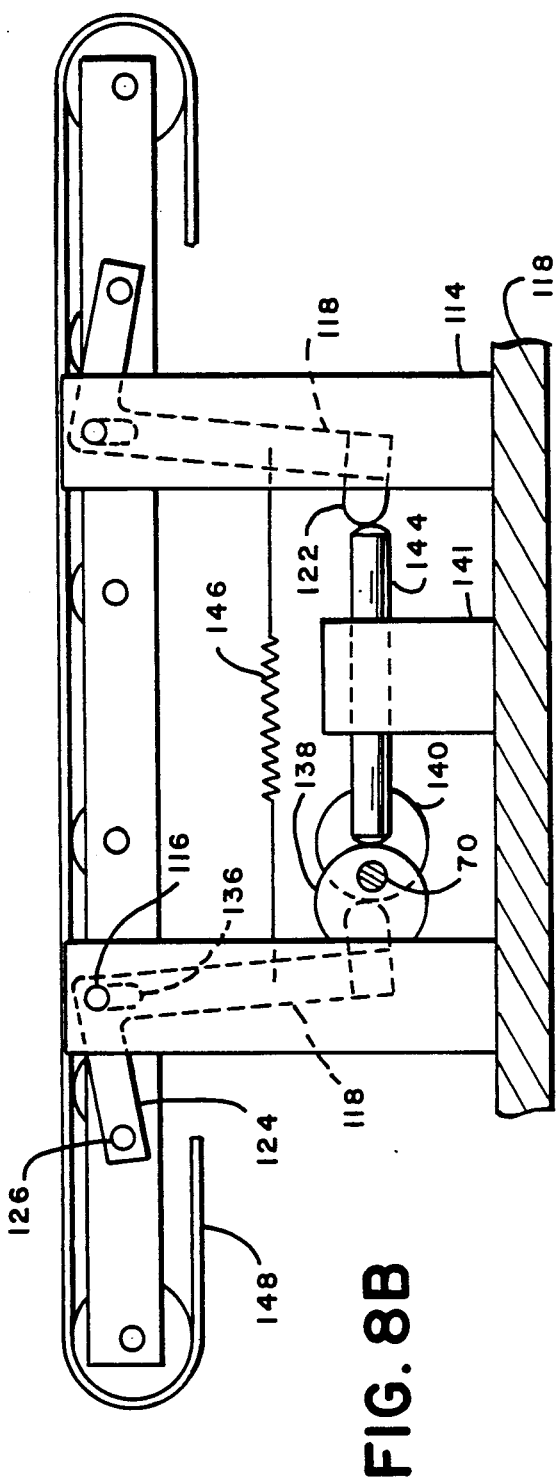

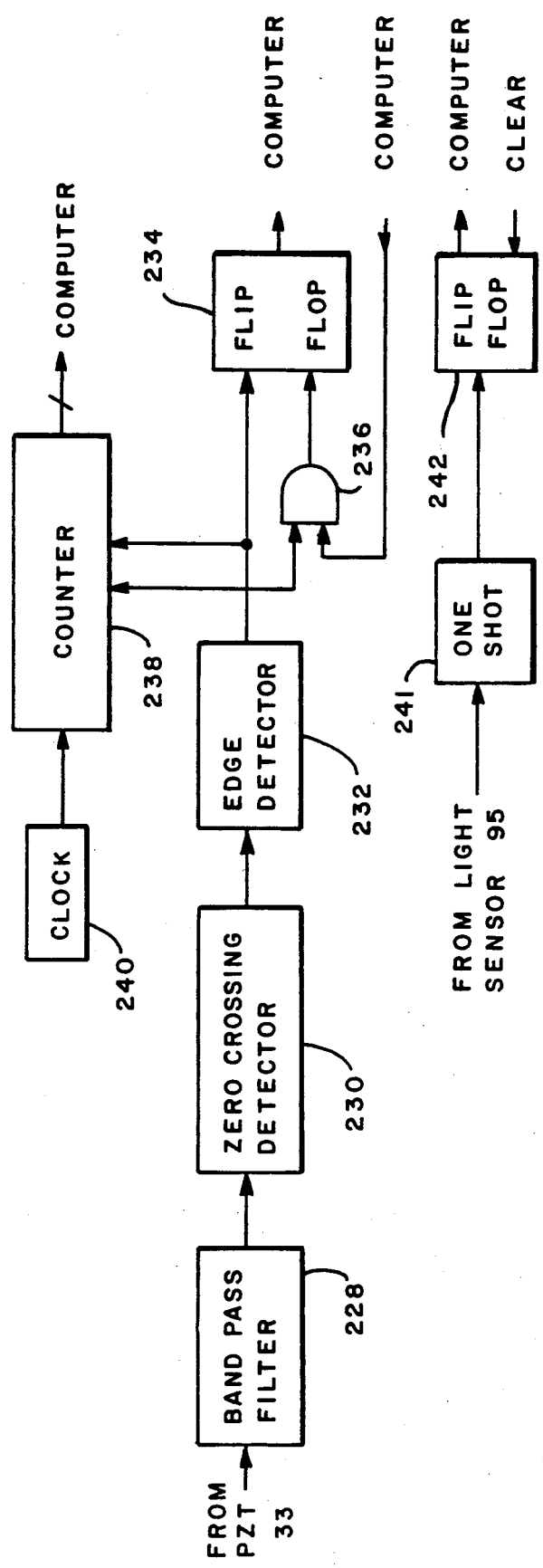
FIG. 12
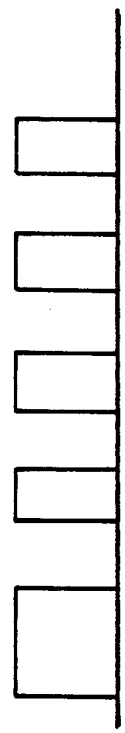
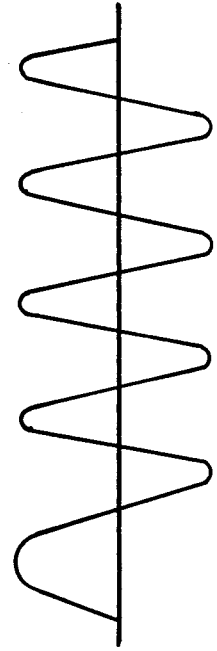
FIG. 13B
FIG. 13A

TRANSPORTING AND DRIVE MECHANISM FOR A WEIGHING SCALE

BACKGROUND OF THE INVENTION

As technology progresses, processes tend to proceed at a faster pace. Most processes require the coordination of a number of components, and the process can only proceed as fast as the slowest component allows unless multiple like components are used. There are certain processes in which the weight of an article is required, but to date no scale has been available that provides accurate, fast weighing. By accurate is meant the ability to weigh an object having a weight of up to 32 ounces within 1/32 of an ounce. By fast is meant the ability to weigh a stream of conveyed articles within less than one second per article. A process where there is a need for fast weighing is in the processing of mail. High speed systems have been developed whereby the appropriate number of inserts, which number may vary from envelope to envelope, are placed within an envelope. The envelope is sealed and postage is printed on the envelope. Before the postage can be printed, however, it is necessary that the weight of the mail piece be determined. Heretofore, weighing devices for such mail processing systems have been developed, but these generally have been rather slow. Actually, many prior weighing devices combined a standard scale with a mechanism that would stop the mail to allow weighing to take place. In order to accommodate the output of an inserter, multiple scales would be used with alternate mail pieces diverted to such scales.

Although these prior weighing devices work rather well with prior mail processing systems, with high speed inserters of contemporary design, the one function that inhibits fast, processing of mail is the weighing of mail pieces before postage is applied thereto. In order to overcome this problem, multiple scales would be used downstream from a high speed inserter and the mail pieces would be alternated to such scales. Obviously, use of multiple scales is expensive and requires additional conveying functions that could result in a greater number of jams.

Much effort has been expanded in trying to develop a weighing scale that meets the heretofore enumerated goals. One such weighing scale is described in co-pending patent application entitled APPARATUS AND METHOD OF DETERMINING THE MASS OF AN ARTICLE BY MEASURING THE SHIFT IN THE PERIOD OF HARMONIC MOTION filed July 13, 1987 and having Ser. No. 073,790. This weighing scale, as well as others of this type, require a conveying mechanism that will place articles onto the pan of the weighing scale quickly, hold the article securely while weighing takes place and removes the article rapidly following weighing.

SUMMARY OF THE INVENTION

A unique transporting and drive mechanism for a weighing device has been conceived. An object is transported onto the tray of a weighing scale by a combination of rollers and skis that are attached to the tray and rollers that extend through an opening in the tray. During weighing the latter rollers are removed from the tray opening and the drive mechanism is described. Upon completion of weighing, the drive rollers are inserted within the opening and the article is conveyed once more off the tray.

BRIEF DESCRIPTION OF THE DRAWINGS

FIG. 7 is a side elevational view taken along the lines 7—7 of FIG. 4;

FIGS. 8A and 8B are side elevational view taken along the lines 8—8 of FIG. 4;

FIGS. 9A and 9B are side elevational view taken along the lines 9—9 of FIG. 4;

FIGS. 10A and 10B are side elevational views taken along the lines 10—10 of FIG. 4;

FIG. 12 is a block diagram of the components of the electronic controller shown in FIG. 11;

FIGS. 13a–13b are graphs that show a single pulse applied to the weighing device, a plot of the output generated by a transducer as a result of the oscillation, and a square wave form of the output, respectively; and FIG. is a flow chart describing the steps involved in measuring the mass of an article.

DETAILED DESCRIPTION OF THE INVENTION

Figure 1:
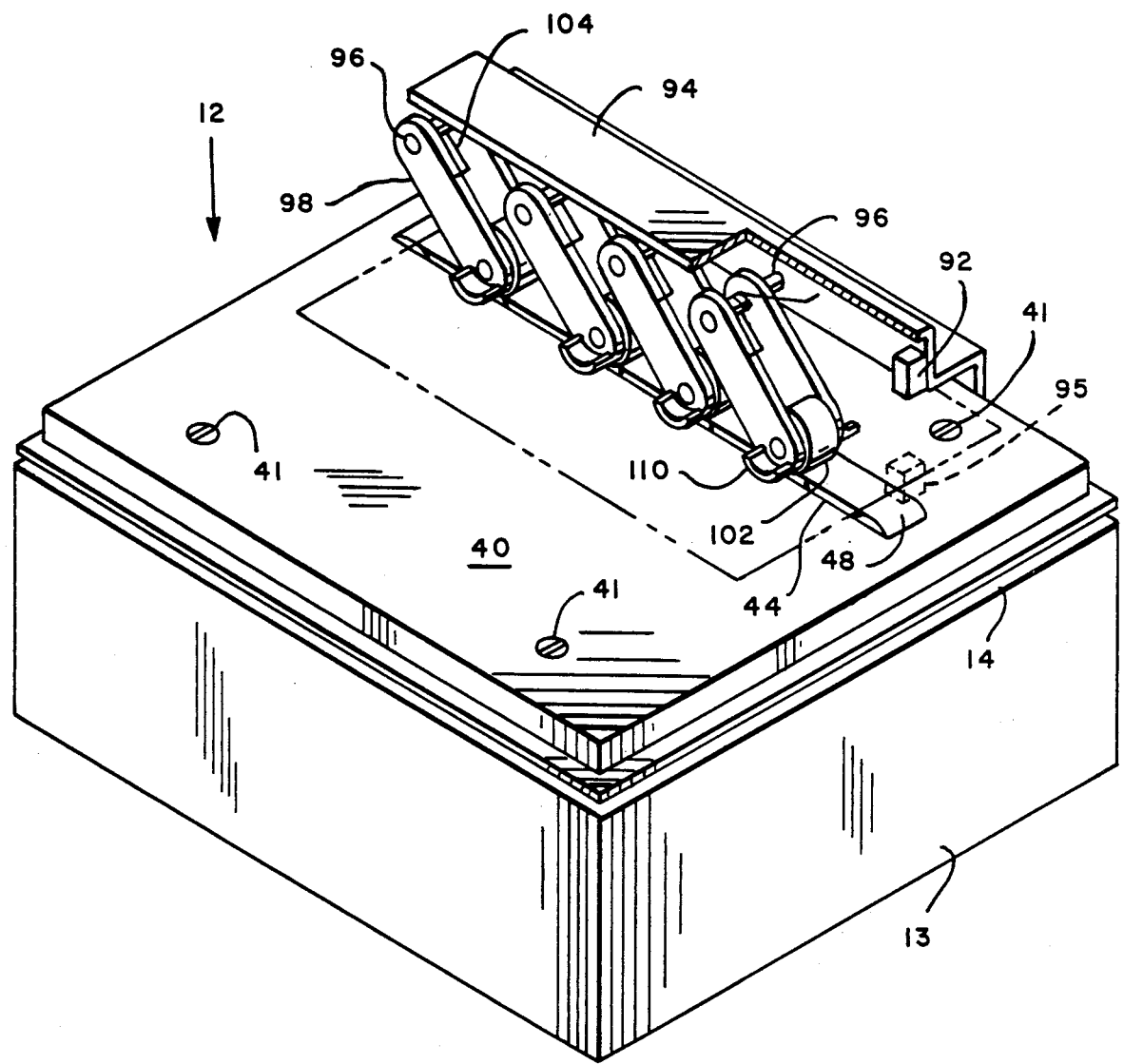
FIG. 1 is a perspective view of a scale that incorporates the instant invention.
Figure 2:
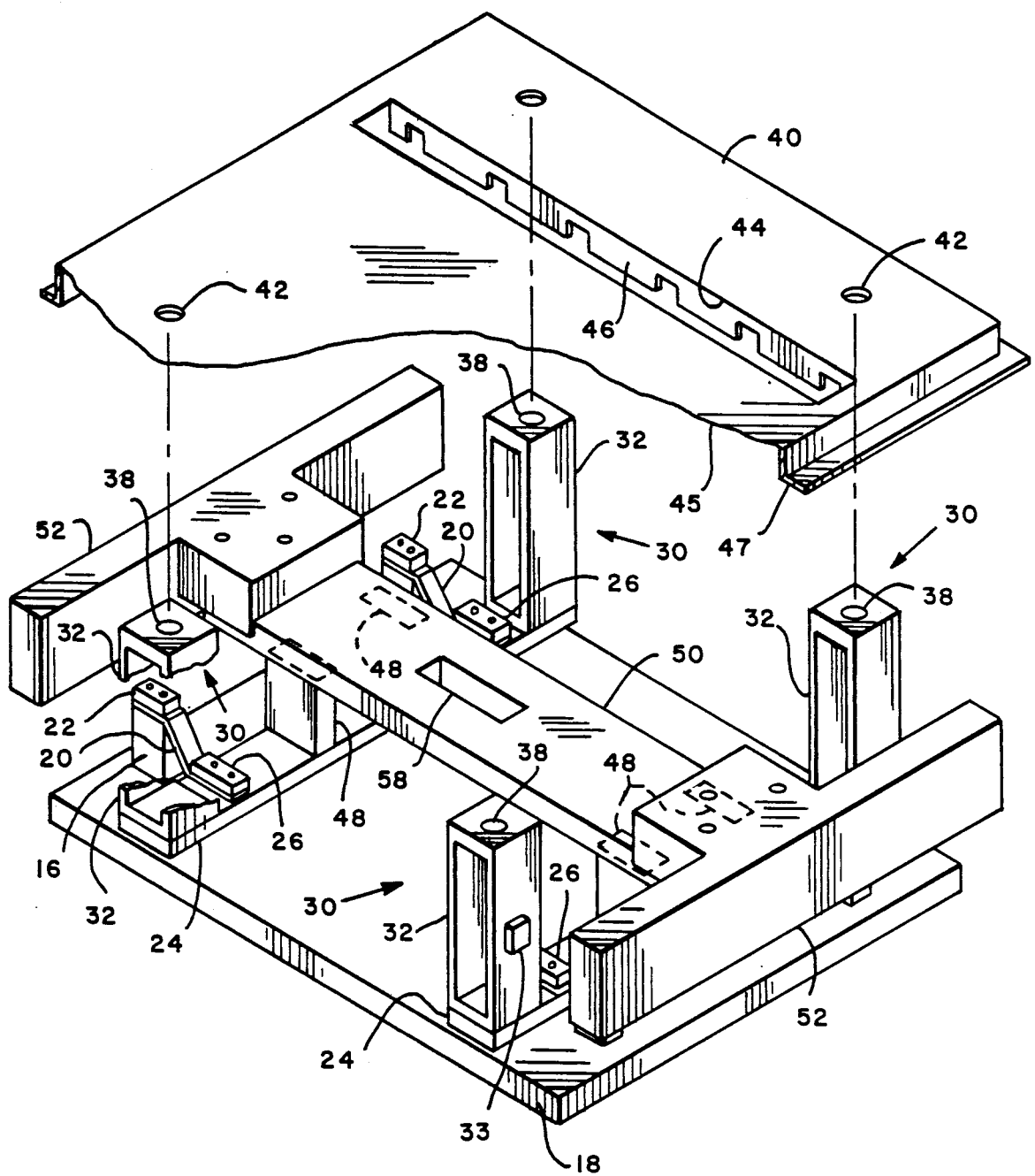
FIG. 2 is an exploded perspective view showing selected parts of the scale shown in FIG. 1.

With reference to FIG. 1, a weighing scale that incorporates the instant invention is shown generally at 12 and includes a housing 13 that is open at the top 14. The components contained within the housing 13 are shown in FIGS. 2—10, and, with reference to FIG. 2, include a frame 18 that is attached to the floor of the housing and supports four uprights 16. To each upright 16 a leaf spring 20 is attached by means of a cap 22 that is bolted to the upright with a portion of the leaf spring therebetween. It will be noticed that the leaf springs are formed at an angle and have a lower portion that is adjacent to one of two laterally extending plates 24. The angle o of the leaf spring is preferably between 5° and 15° relative to the vertical. The springs 20 are bolted to the plates 24 by a cap 26, the lower portion of the springs being located between the caps 26 and the plates 24. In this way the two plates 24 are attached to the frame 18 by the springs 20 and are thereby isolated from the frame.

Figure 6:
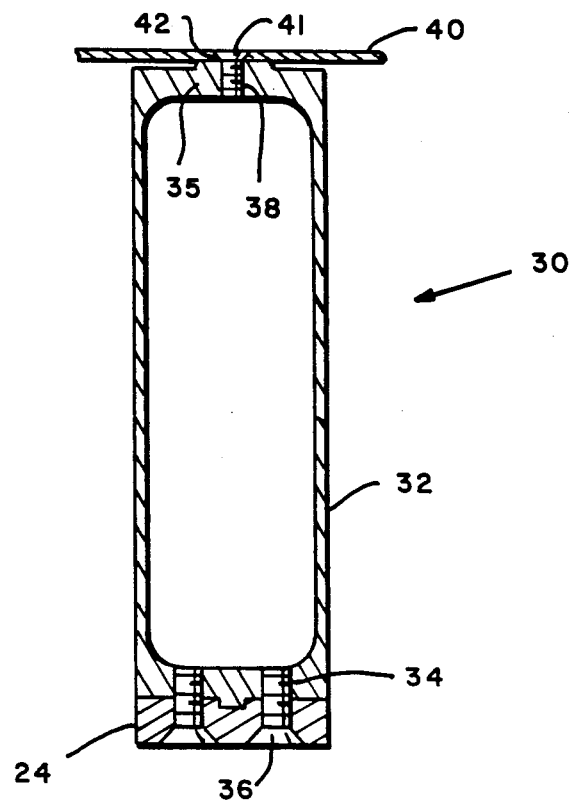
FIG. 6 is a cross-sectional view of a flexure member that is part of the scale shown in FIG. 1.

Secured to each of the plates 24 are a pair of flexible members 30 made of an elastic material such as aluminum or steel and having a generally parallelogram configuration, the details of whose structure is shown in FIG. 6. Each flexible member 30 has a pair of opposed parallel flexible plates 32 joined together by integral connecting members 35. A transducer 33 is secured to at least one of the sides 32 of one of the flexible members 30. This transducer may be a device such as a piezoelectric device such that a voltage is generated in accordance with the bending of the transducer. The flexible members 30 have a pair of openings 34 at the bottom thereof that receive bolts 36 that extend through the plates 24 to thereby secure the flexible members to the plates. The flexible members 30 also have an opening 38 at the top thereof that are in registration with openings 42 within a tray 40. The tray 40 is attached to the flexible members 30 as by bolts 41 that are received within the openings 38 of the flexible members. The tray 40 also has a longitudinally extending opening 44 therein. The tray 40 is in the form of a plate 45 having depending, stepped rim 47 made of aluminum or other stiff material. Attached to the bottom of the plate are a plurality of aluminum struts 46 that provide light weight and stiffness to the tray 40.

Figure 3:
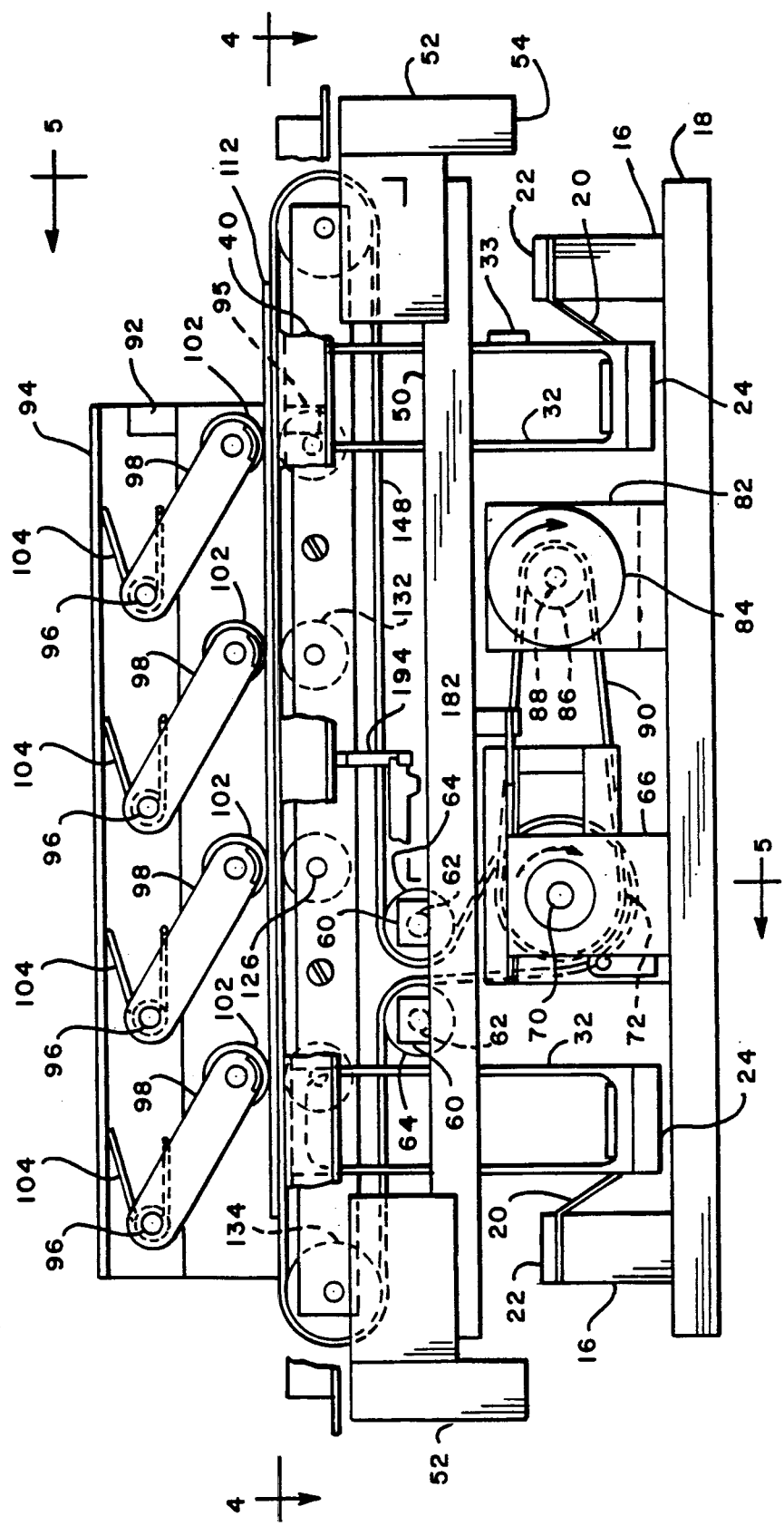
FIG. 3 is a cross-sectional longitudinal view of the scale shown in FIG. 1.
Figure 5:
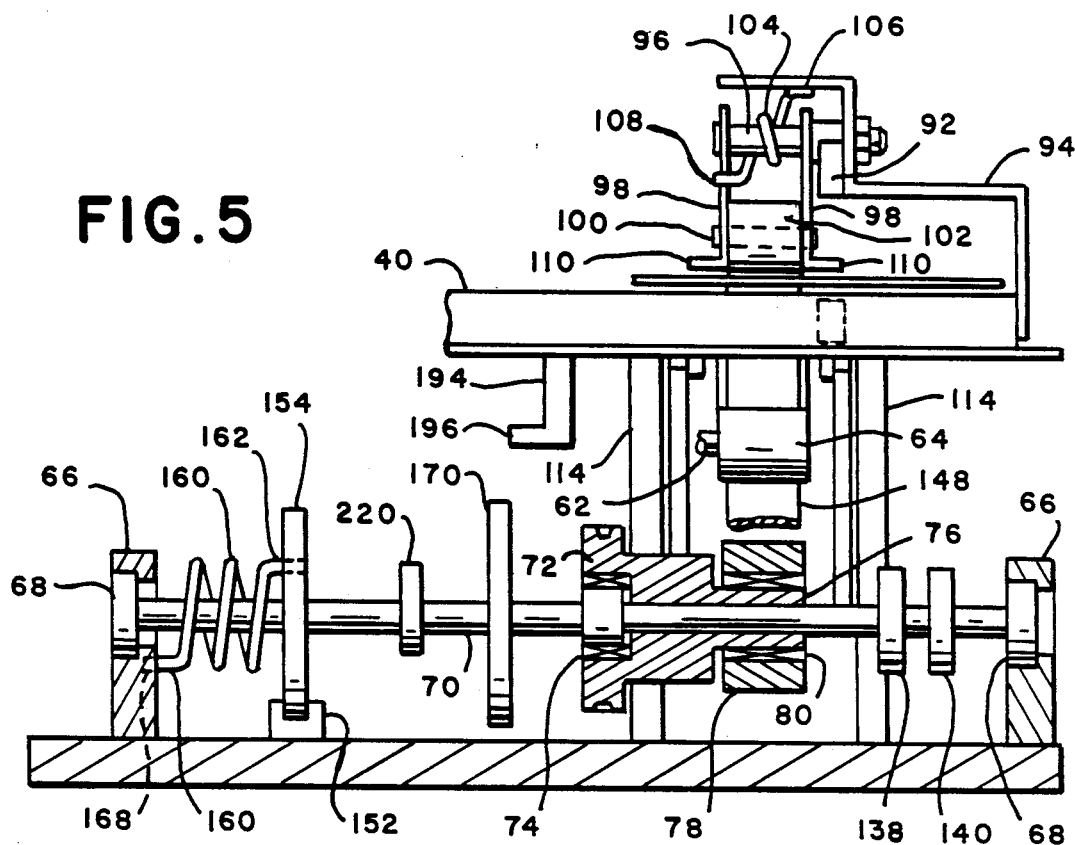
FIG. 5 is an end view taken along the lines 5—5 in FIG. 4.

Four uprights 48 are attached to the two plates 24 and mounted thereon is a base 50 having generally "T" shaped members 52 with dependent portions 54 attached thereto. The purpose of the T shaped members 52 and dependent portions is to increase the weight of the base 50. With reference to FIG. 3, two pairs of opposed brackets 60 are supported by the frame 18 and each pair of brackets supports a pin 62 therebetween. An idler pulley 64 is rotatably mounted on each of the pins 62. With reference to FIGS. 3 and 5, a pair of opposed brackets 66 are supported by the frame 18 and each bracket has a bearing 68 therein that receives a shaft 70 that is thus supported by the opposed brackets. A pulley 72 is disposed upon the shaft 70, there being a one way bearing 74 between the pulley 72 and shaft 70 thereby allowing the pulley to be free wheeling relative to the shaft when the pulley is rotated in one direction, i.e. no drive will be transmitted therebetween, but the shaft will be driven by the pulley 78 when the pulley 72 is driven in the opposite direction. The pulley 72 has a sleeve portion 76 about which another pulley 78 is mounted with a one way bearing 80 therebetween. The one way bearing 80 will be opposite in terms of functional direction to that of the one way bearing 74 so that when the pulley rotates in the clockwise direction, as seen in FIG. 3, the one way bearing 80 will provide drive between the pulley 72 and pulley 78 but when the pulley 72 is driven in the counter clockwise direction, pulley 78 is free wheeling and no drive is transmitted therebetween.

A bracket 82 mounts a reversible motor 84, there being a pulley 86 secured to the output shaft 88 of the motor. A belt 90 is trained about the pulleys 72,86 to provide drive to the pulley 72.

A stepped bracket 94 is mounted to the tray 40 and supports a light 92. A photodetector 95 is located immediately below the tray 40 there being an opening within the tray for light to pass through. The detector is in alignment with the light 92 so as to sense the presence of an object therebetween. The bracket 94 supports a plurality of shafts 96 to which paired arms 98 are attached, there being pins 100 extending between and joining the paired arms, each pin supporting a idler roller 102. A tension spring 104 is supported by each of the shafts 96, the tension spring having a first tang 106 that abuts the bracket 94 and a second tang 108 that is in engagement with the upper part of one of the paired arms 98. With this construction, the arms 98 are biased towards the tray 40. A pair of arcuate skis 110 are located on each of the paired arms 98. A mail piece 112 in the form of an envelope is shown in FIG. 3 in a position in which its weight would be determined by the weighing scale 12.

Figure 4:
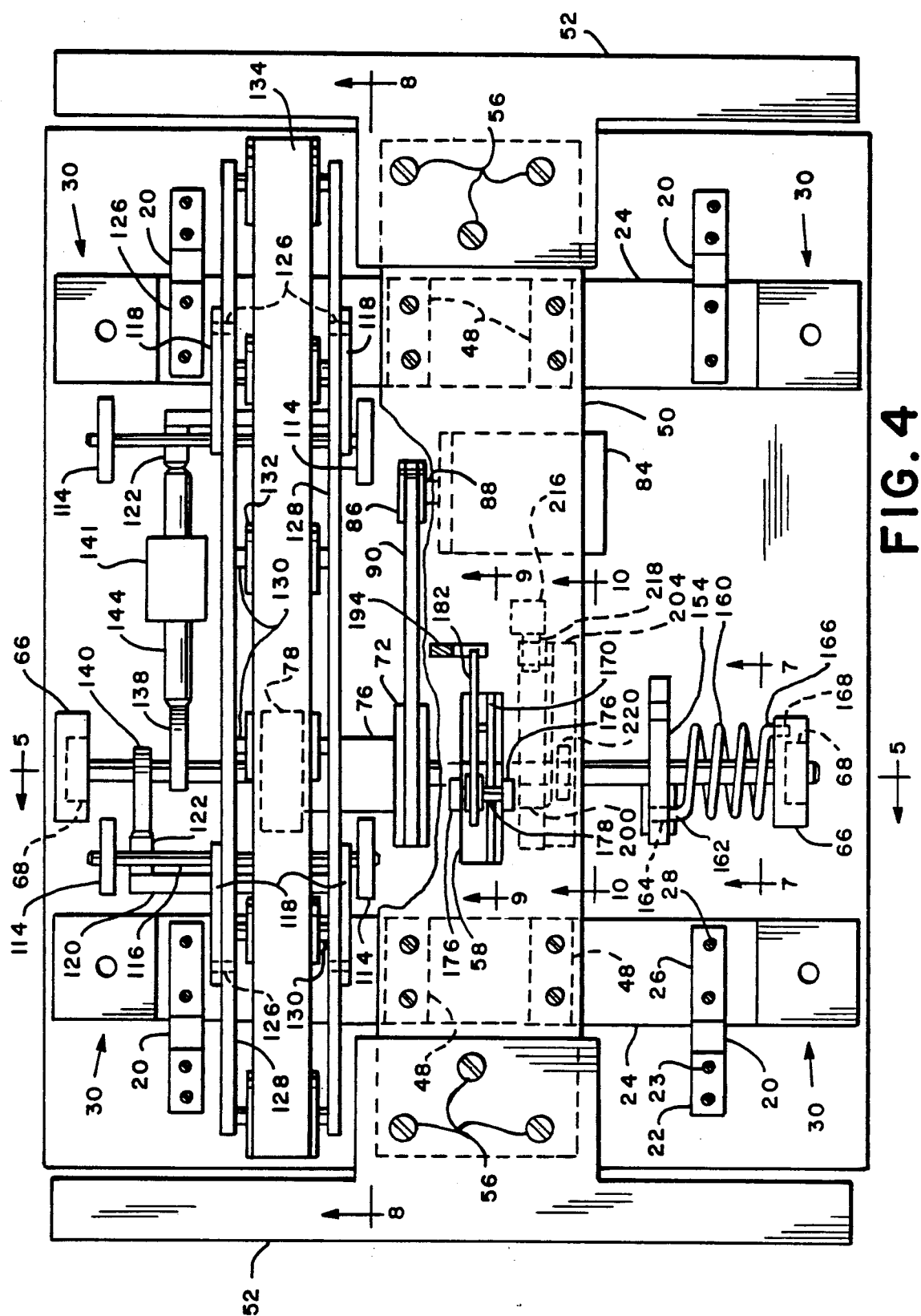
FIG. 4 is a plan view taken along the lines 4—4 of FIG. 3.

With reference to FIGS. 4 and 8, two pairs of stanchions 114 are located opposite one another in a paired relationship and connected by a shaft 116 that is supported fixedly by each pair of stations 114. Rotatably supported by each shaft 116 are a pair of generally L-shaped arms 118 that are joined together by a connector 120. Secured to each connector 120 is a follower 122. The upper portions of the arms 124 are rotatably supported by pins 126 that are received within a pair of brackets 128. The brackets 128 are connected to one another by shafts 130 that rotatably receive intermediate rollers 132 and end rollers 134, the latter being slightly larger. Each of the brackets 128 has an elongated slot 136 therein that receive the shaft 116 thereby allowing movement of the brackets relative to the shaft. A pair of cams 138,140 are mounted on the shaft 70, one of the cams 140 being in engagement with the cam follower 122. A stanchion 141 having a longitudinal extending opening 142 therein slidably receives a rod 144 within such opening. The rod 144 is in engagement with the cam 138 at one end, and a follower 122 of an arm 118 at its other end. A tension spring 146 is secured to opposed pairs of arms 118 for the purpose of urging the followers 122 against the cam 140 and rod 144, respectively.

Referring now to FIGS. 4 and 7, the frame 18 has mounted thereon an abutment 152. The shaft 70 fixedly supports a cam 154 that has a large diameter portion 156 and a small diameter portion 158. Disposed about the shaft 70 is a spring 160 having one tang 162 that is received within an opening 164 of the cam, and another tang 166 that is received within the opening 168 of the stanchion 66. The spring rotates the cam 154 and shaft 70 in the clockwise direction as seen in FIG. 7 to thereby urge the cam portion 156 against the abutment 152.

With reference to FIGS. 5 and 9, the scale 12 has a mechanism 169 responsive to the shaft 70 for locking and initiating oscillation that includes a cam 170 that has an opening 171 therein with a first camed surface 172 and a second camed surface 174, the cam 170 being mounted on the shaft 70 for rotation therewith. A support 176 is located on the base 50 and a shaft 178 is attached to this support. A generally V shaped link 180 is mounted about the shaft 178 with a friction bearing 179 located therebetween. The function of the friction bearing is to create a resistance to movement on the part of the link 180 so that force is required to rotate the link about the shaft. The generally V shaped link 180 has a first arm 182 and a second arm 184, the latter having a cam follower 186 at the end thereof that is received within the opening 171. The first arm 182, has a projecting portion 188 that has an angular bearing surface 190 with a shoulder 192 at the end thereof A finger 194 depends from the tray 40 and has a rectangular abutment member 196 that is engageable with the projection 188 to lock the tray 40 to the base 50. The rest position of the tray 40 as a result of the flexible members 30 is such that the abutment portion would be located t a position midway of the angular bearing surface 190.

Referring now to FIGS. 5 and 10, a locking mechanism 198 is provided for locking the tray 10 during the periods when objects to be weighed are transported onto the tray and releasing the tray 40 during oscillation A lambda (upper case) shaped stanchion 200 is supported by the frame 18 and has a pin 202 extending therefrom. A generally Z shaped link 204 is rotatably supported by the pin 202 and has a first leg 206, and a second leg 207, the latter having an opening 208 therein. A post 210 is supported by the frame 18 and a tension spring 212 extends from the opening 208 to the post 210 to urge the arm link 204 in a counter clockwise direction. A first leaf spring 214, preferably made of stainless steel is supported by and extends from the stanchion 200 towards and is in spaced relationship with the second leg 206. A finger 216 depends from the base 50 and supports a second leaf spring 218 that extends intermediate the first leaf spring 214 and the stanchion 200 so as to lock the base 50 as a result of the force applied by the leg 206 resulting from the biasing effect of the spring 212. Mounted on the shaft 70 is a cam 220 for rotation therewith. This cam 220 engages the link 204 as the shaft 70 rotates to overcome the effect of the spring 212 and urge the link in a clockwise direction and disengage the leg 206 from the leaf spring 214, thereby unlocking the base 50 from the frame 18.

Figure 11:
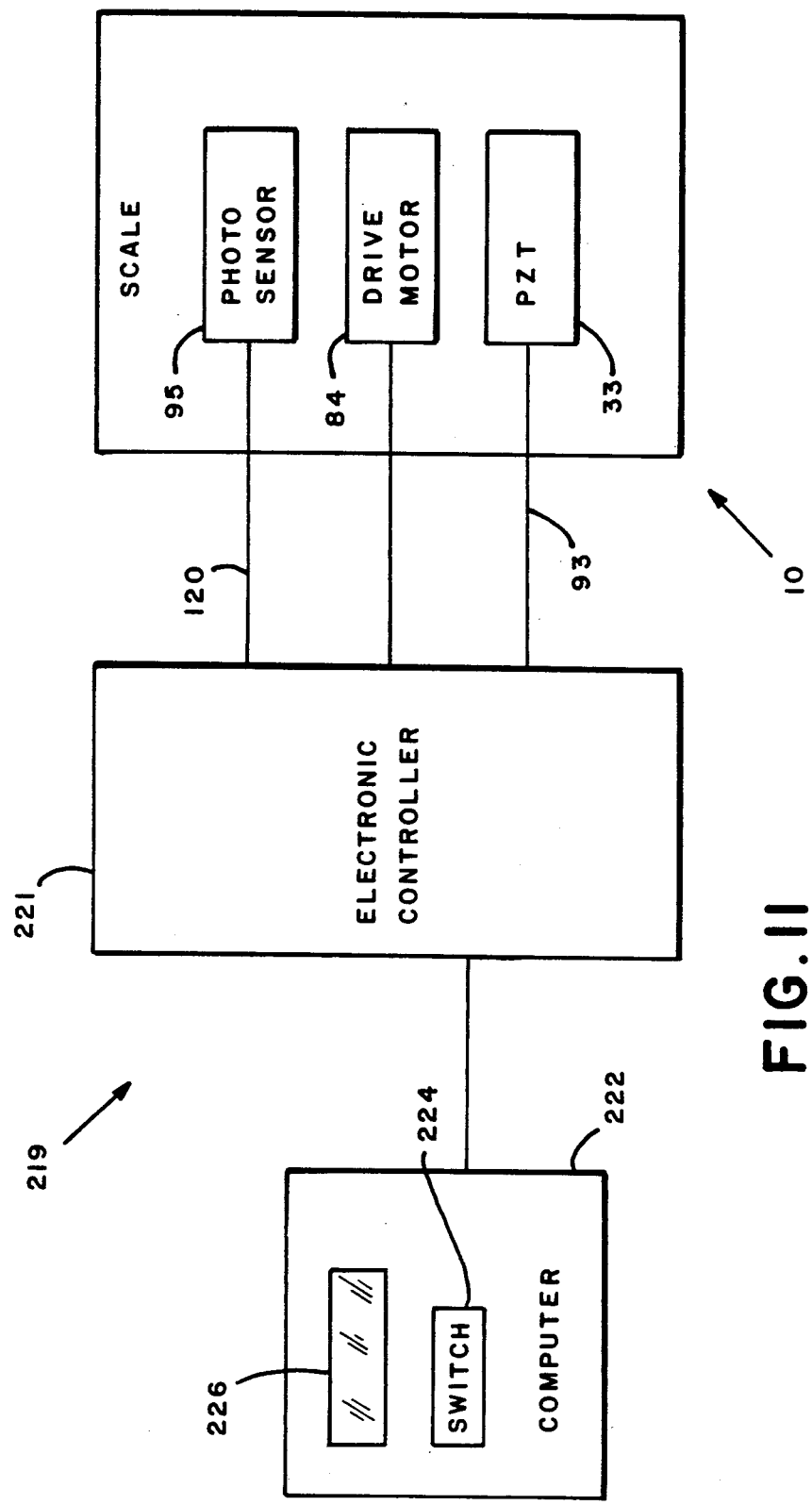
FIG. 11 is a block diagram of the circuitry employed within the scale shown in FIG. 1.

Referring now to FIG. 11, the electrical system is shown generally at 219 and is supported within the housing 13. A controller 221, the details of which are shown in FIG. 12, is in communication with a computer 222 that has a switch 224 for connecting the scale with line power and a display 226 where the weight of an object that is determined by the scale will be shown. The electronic controller 221 is in electrical communication with the photosensor 95, the drive motor 84 and the piezoelectric 33.

The components of the electronic controller 130 are shown in FIG. 12 and include a band pass filter 228 that receives the output from the piezoelectric transducer 33 and is connected to a zero crossing detector 230. The band pass filter 228 eliminates high frequency electrical noise and low frequency mechanical noise from the signal received from the piezoelectric transducer 33. In electrical connection with the band pass filter 228 is the zero crossing detector 230 which converts the signal received from the band pass filter to a square wave. The zero crossing detector 230 is in electrical connection with an edge detector 232 that detects the edge of each square wave produced by the zero crossing detector. The edge detector 232 is in electrical connection with a flip-flop 234 that receives an input from a AND gate 236. The AND gate 236 is in connection with the computer 222 and a counter 238 that has input from a clock 240 and the edge detector 232. A one shot vibrator 241 is in connection with a flip-flop 242 and with the photosensor 95. The flip-flop 242 is in communication with the computer 222. Thus, as a mail piece 112 is sensed by the photosensor 33, the one shot vibrator 241 will send a pulse to the flip-flop 242 which in turn will communicate to the computer 222 the presence of a mail piece. Alternatively, after a mail piece 112 is conveyed away from the tray 40 to no longer be sensed by the photosensor 33, the one shot 241 will again pulse the flip-flop 242 to signal the computer 222.

During the weighing operation, the base 50 is isolated from the frame 70 because of the leaf springs 20. By isolation is meant that the transmission of vibrations from the frame to the base are substantially eliminated. Leaf springs 20 have been found to be advantageous because by selecting a preferred angles, between 5° and 15° inclusive, the angular momentum of vibration from the frame can be reduced substantially. Furthermore, the leaf springs 20 reduce the torque between the scale 12 and whatever object it is placed upon; such as a mailing machine, and thus, reduce the sensitivity to the mechanical properties of the supporting object. Additionally, during weighing, the base 50 is constrained by the leaf springs 20 to move linearly parallel to the frame 18. The mass of the tray 40 is determined, as described hereinafter, by vibrating it relative to the base 50 and measuring its period of oscillation. If the center of mass of the base 50 and tray 40 are not coincident then such vibrations has non-zero angular momentum. By a correct choice of the angle o, the angular momentum is reduced essentially to zero.

In operation, power is supplied to the scale 12 by enabling the switch 224 located on the computer 222. Although the switch is shown on the computer 222, it is apparent that this is not critical in any convenient means may be used for providing power to the scale 12. With power supplied to the system, the motor 84 will be caused to drive in a clockwise direction thereby rotating the pulley 72 through the belt 90. With rotation of the pulley 72, the pulley 78 will be rotated due to the presence of the one way bearing 80. The pulley 78 is driven in a clockwise direction as seen in FIG. 3 thereby driving the belt 148. With the belt 148 being driven, the pulley 64 and the drive rollers 134 will also be driven. The smaller rollers 132 act as support for the belt 148 as it moves within the opening 44 of the tray 40.

It will be noted that as the belt 148 is being driven, the shaft 70 is static. This results from the presence of the one way bearing 74 which allows the shaft 70 to remain free wheeling within the rotating pulley 72 when the latter is driven in the clockwise direction. With the shaft 70 being static, the tray 40 is locked to the base 50 because of the locking oscillating mechanism 169 and the base 50 is locked to the frame 18 because of the locking mechanism 198. When a mail piece 112 is to be weighed, it is placed upon the tray 40 at the location of the belt 44 and conveyed between the belt and the idler rollers 102 Because of the biasing action of the springs 104 upon the arms 98, the rollers 102 will engage a mail piece 112 and urge it against the belt 148 until such time as the mail piece envelope 112 comes between the light 92 and photosensor 95. Upon this occurring, the photosensor 95 will send a signal to the computer 222 indicating the presence of the envelope 112. Upon this occurring, the computer 222 will cause the electronic controller to reverse the angular rotation of the drive motor 84 from clockwise to counter clockwise This counter rotation will be for only a 180° rotation of the motor output shaft 86.

With the motor 84 rotating in the reverse direction 180°, the drive to the belt 148 will be terminated and the shaft 70 will be rotated 180°. This results from the pulley 72 being rotated in the opposite direction 180° thereby allowing the pulley 78 to be free wheeling due to the presence of the one way bearing 80. Meanwhile, the one way bearing 74 will transmit drive from the pulley 72 to the shaft 70. With such rotation of the shaft, the spring 160 will be overcome and the cams 138,140, the cam 154 and the cam 170 will also be rotated half a revolution.

With reference to FIG. 8, FIG. 8A shows the posture of the brackets 128 and the rollers 132,134 that are supported thereby when the motor 84 is continuously driving in a clockwise direction. This is the posture in which a mail piece 112 will be transported across the tray 40 by the belt 148. As the motor 88 rotates in an opposite counter clockwise direction half a revolution, the cams 138 and 140 are rotated by the shaft 70 so as to assume the position shown in FIG. 8B. In this posture the cams 138,140 are rotated so that their surfaces are driven away from engagement with the rod 144. With this occurring, the tension spring 146 will pull upon the opposed paired arms 118 towards one another to thereby urge one of the cam followers 122 against the cam surface 140 and the other cam follower 122 against the rod 44. With this occurring, the rod 144 will move to maintain engagement with the cam 138, to the left as seen in FIG. 8, and the arms 118 will be rotated in unison with the shaft 116 with the opening 136 thereby causing the bracket 128 to move downwardly. The presence of the elongated slot 136 in the arms bracket 128 provides the space required for such movement As the bracket 128 is pulled down by the action of the arms 114, it carries therewith the belt 148 and the accompanying rollers 132,134 out of the opening 44 of the tray. With reference to FIGS. 3 and 5, upon this occurring, the springs 90 will urge the arms 98 downwardly thereby urging the rollers 102 against the mail piece 112 and the skis 110 against the mail piece at the location of the tray 40. When in the drive condition, the belt 148 was located within the slot 44, the rollers 102 engaged the mail piece so as to cooperate with the drive thereof and the skis 110 were at a location slightly above the envelope With the belt 148 removed from the opening 44, the rollers 102 will engage the mail piece at the location of the opening, the skis 110 will hold the mail piece against the tray 40. In this way, the mail piece 112 is held firmly against the tray 40 during oscillation of the tray as will be described hereinafter so that an accurate weight can be made. Obviously, if the envelope experiences any movement during oscillation, an inaccurate weighing would not be obtained.

With reference to FIG. 10, upon rotation of the shaft 70, the cam 220 will be rotated in the counter clockwise direction and engage the link 204. This will cause the link 204 to be rotated about the pin 202 in a clockwise direction thereby disengaging the first leg 206 from the leaf springs 214,218 and unlocking the base 40 from the frame 18.

Referring now to FIGS. 5 and 9, when the tray 40 is in the posture assumed when the motor is rotating in a clockwise direction, the cam 170 is in the position as shown in FIG. 9A. In this position, the tray 40 is locked to the base 50 by the presence of the arm 182 engaging the finger 194. More specifically, the shoulder 192 will receive the abutment member 196 and hold it firmly. It will be recalled that the spring 160 urges the opening 171 against the cam follower 186 to rotate the link 180 in a clockwise direction. As the shaft 70 is rotated a half revolution by the motor 84, the cam 170 begins to rotate in the counter clockwise direction as shown in FIG. 9A and the cam follower 186 will follow the first surface 172 until such time as it comes to the end of the opening whereupon the arm 182 will be rotated about the shaft 178 in the counter clockwise direction, thereby releasing the finger 194. The rectangular abutment member 196 will lose engagement with the shoulder 190 thereby causing the tray 140 to oscillate as a result of the tray 40 seeking its rest position More specifically, when the abutment member is in engagement with the shoulder 190, kinetic energy is stored in the flexible members 30 that creates a force in the tray towards the arm 182 which generates oscillation of the tray 40 upon release of the finger 194. After a weighing has taken place, and the shaft 70 is rotated to its original position, as a result of the motor rotating the pulley 76 clockwise to release the shaft and the spring 160 rotating the shaft 70 half a revolution clockwise. The cam follower 186 will now follow the contoured surface 174 to thereby urge the arm 182 into a clockwise direction. With this occurring, the rectangular portion 196 will slide along the angle portion 188 thereby urging the tray 140 to the right as shown in FIG. 9 and away from its rest position until such time as the abutment member 196 once more is cradled into the shoulder 190. In this position of the tray 40, the flexure members 32 are flexed slightly to apply a force on the tray to the left as seen in FIG. 9 so that the tray will oscillate upon being released by the locking and oscillating member 169 as just described.

With the tray 40 oscillation created as described heretofore, the flexure members 30 will be flexed and a voltage will be generated by the piezoelectric transducer 33. This voltage plotted relative to time will produce a sinusoidal curve as shown in FIG. 13a. It will be noted that the flexure members 32 have a parallelogram configuration with the arms 32 parallel to one another This is advantageous over having a single flexure member for the reason that the bending stresses normally would be at the root of a single flexure are self contained within the parallelogram and are not transmitted to the tray 40. This enables the tray 40 to be of lighter construction and eliminates possible non-linearity that would occur if stresses were to be allowed to enter the tray structure. With the flexure member 30 having parallel arms 32, as shown in FIG. 6, the top of the flexure member, as well as the tray 0, moves generally parallel so that it does not exert a torque on the tray. The tray 40 does move to a somewhat lower position when the flexure members 30 bend, but this is not a particular problem. With a single flexure member, there is a slight bend of the tray. This slight bend contributes to spring constant of the scale which results in a frequency that is amplitude dependent. Since the tray is not a good elastic material, there is a deterioration of the ability to determine the weight of an object or the tray. The tray 40 should be light and rigid and move as a single unit while the base 50 should be heavy and rigid and move as a single unit. The flexure members 30 store potential energy whereas the tray has kinetic energy.

Upon oscillation of the tray, the transducer 33 will send the signal as indicated in FIG. 13 and the weight will be determined as will be hereinafter described.

After the shaft 70 has been rotated a half revolution by the motor as described, the tray 40 is unlocked for the base 50 and the base is unlocked for the frame 18. the plates 24 are suspendingly supported by the leaf springs 20 to the frame to thereby isolate the base from vibrations experience by the base. Angular leaf springs have been found to be advantageous because they inhibit lateral movement of the base 50 while still providing the required isolation.

Although the transporting and drive mechanisms for conveying a mail piece 112 across the tray 40, including the rollers 102,132 has been shown and described with reference to a vibrating tray scale, it will be appreciated that the transport and drive mechanism may be used in other types of weighing scales as well. For example, the flexible members 30 could be replaced with coil or leaf springs, a load cell structure or other types of weighing components.

The manner of determining weight will now be described. With the tray 40 having no mail piece 112 thereon, the motor 84 is actuated to drive the belt 90 half a revolution in the reverse direction. This causes the first arm 182 to disengage from the finger 194 to occasion oscillation of the tray 40 as described previously with the reference to FIG. 9. The tray 40 will oscillate in the same horizontal direction as the mail pieces 112 are to be conveyed, i.e., in the plane of the tray, left and right as seen in FIG. 3. This is preferable otherwise the mail pieces 112 may tend to bounce. As the flexible member 30 with the transducer 33 thereon is flexed and continues to oscillate, the transducer will output an alternating voltage that will have a frequency depending upon the mass of the tray 40 and anything secured thereto. It will be noted that the tray 40 has the idler rollers 102 and the mechanisms for supporting the idler rollers attached thereto and is part of the mass that influences the frequency. As the tray 40 oscillates, its oscillation is measured by the transducer 33 as an output voltage as shown in FIG. 13. When the tray 40 is first oscillated, the sinusoidal curve is not symmetric and at least one cycle is required before a uniform curve is obtained. Consequently, a delay is required before measurements can be taken, this delay being programmed into the computer 222 and is approximately 0.024 secs. After the delay, the frequency, or period, of zero crossings is determined by the electronic controller 221. After the frequency of zero crossings is determined, an article such as an envelope or mail piece 112 is placed upon the tray 40. This is accomplished by first supplying power to the motor 84 and other components by closing the switch 222. Thereafter a mail piece 112 is placed upon the tray 40 by any standard mail piece conveying means until it is received within the nip of the belt 112, and the first idler roller 102. The mail piece 112 will then be driven onto the tray 40 by action of the belt 112 and rollers 102 and will be sensed by the photosensor 95. Upon the mail piece 112 being sensed, the drive motor 84 will be rotated half a revolution in the opposite direction and the brackets 128 lowered, as described previously with reference to FIG. 8, thereby lowering the belt 148 below the plane of the tray 40. As the brackets 128 are pulled down from the tray 40, the belt 148 becomes disengaged from the mail piece 112 that is located upon the tray 40. In this state the tray 40 will have a new mass, which now includes the mass of the mail piece 112. It will be appreciated that the mail piece 112 will be held securely upon the tray 40 because the rollers 102 will be lowered slightly into the opening 44 and the skis 110 will press the mail piece 112 against the tray as a result of the biasing action of the springs 104 so the mail piece and tray 40 will move as a unit.

With the mail piece 112 on the tray 40 in its weighing position, i.e., under the rollers 102, the locking and oscillating mechanism 169 will once more be enabled causing the tray 40 to oscillate, as described previously, in the same horizontal plane and direction as the mail piece 112 is transported. This oscillation will be sensed by the transducer 92 and the period of oscillation will be measured as described previously. From this, one will be able to determine the mass of the mail piece 112 located upon the tray 40 in accordance with the formula:

$$M_E = C_1(T^2 - T_0^2) + C_2(T^2 - T_0^2)^2, \quad (1)$$

where $M_E$ is the mail piece 112 mass, $T_0$ is the period of oscillation with no mail piece and $T$ is the period with the mail piece present upon the tray 40. $T_0$, $C_1$ and $C_2$ are constants which depend on the mass of the base 50, and the mass of the tray 40 as well as on the spring constants of the isolation springs 20 and the flexible supports 30. These constants are determined empirically in a calibration procedure in which the periods are determined for at least two different masses as well as for the empty scale. In the limit that the base 50 is substantially heavier than the mass of the tray 40 plus the mass of the mail pieces 112, the constant $C_1$ is given by the formula:

$$C_1 \simeq K/(4\pi^2), \quad (2)$$

where K is the spring constant of the flexible supports 30. In the same limit $T_0$ is given by the formula:
$$T_0^2 \simeq (4\pi^2) M_p/K, \quad (3)$$

where $M_p$ is the tray 40 mass.

When a spring is attached to two isolated masses m and M, its period of oscillation is
$$T^2 = 4\pi^2 \mu/K. \quad (4)$$

where $\mu$ is the reduced mass:

$$\mu = m M/(m+M). \quad (5)$$

In the limit where M is much larger than m, the reduced mass is less than and close to the value of m. Equation (4) can be solved for m in terms of T. In the scale 12, the base 50 mass M is much larger than m, the combined tray 40 and mail piece 112 mass; however, due to the accuracy required, the difference between $\mu$ and m must be taken into account. This is done by combining equations 4 and 5.

There are other corrections to the period due to the fact that the system is damped slightly and due to the fact that the base 50 is attached to the frame 18 through the isolation springs 20. The system is further complicated by the fact that the attempt to determine the period is done through measurements of the first few periods of oscillation. During this time, some initial transients due to the initial pulse are occurring. As a result, it can be said that the mass is a non-linear function of the period squared with the leading non-linearity given by equations 4 and 5. It has been observed empirically that the non-linearity can be approximated by a parabola represented by equation 1.

The mass is determined by the circuitry shown in FIGS. 11 and 12. The computer 222, which may be any of a number of standard commercially available computers such as a Compaq Model 286 PC, is in communication with the electronic controller 221. The transducer 33 will output a voltage that is filtered by the band pass filter 228 and applied to the zero crossing detector 230 which is basically an operational amplifier that saturates at five volts to output a square wave as shown in FIG. 13b. The duration of the square wave yields the time between zero crossings which is determined by the edge detector 232. The edge detector 232 outputs a pulse when each edge of the square waves is detected, which of course, represents zero crossings These outputs are sent to the counter 238 that counts the clock cycles between zero crossings and sends count signals to the AND gate 236. The flip-flop will then send zero crossing signals to the computer 222. Based upon this count, the computer 222 will then compute the mass of the mail piece 112 through an algorithm that allows computation by application of the above formulas. This computed mass is then shown on the display 226 or sent to a postage setting device of a postage meter such as a Model 6500 postage meter available from Pitney Bowes Inc.

Upon completion of weighing, the computer will disable the motor 48 thereby providing no power to the belt 90. With this occurring, with reference to FIGS. 4, 5 and 7, the spring 160, which is overcome during the half revolution drive of the motor 84 will act upon the cam 154 to rotate the shaft in a counter clockwise direction as shown in FIG. 7. With the rotation of the shaft in a counter clockwise direction, the cams 138,140 will rotate it so as to act upon one pair of arms 114 and the rod 144 will push against the arms 114,115 to rotate them about the shafts 116 thereby lifting the brackets 128 and causing the belt 148 to be inserted once more into the opening 44 of the tray 40.

With this same rotation of the shaft 70 caused by the spring 160, the cam 170 will rotate and thereby cause the link 180 to be rotated in a clockwise direction as seen in FIG. 9. As this occurs, the rectalinear abutment member 96 of the finger 194 slides upon the incline portion of the projection 188 thereby urging the tray 140 to the right as shown in FIG. 9. This continues until the rectangular abutment portion 196 falls into the shoulder 190 and is secured thereby. In this position, the tray 140 is slightly to the right relative to its neutral position so that the flex members 30 are under tension. In this way, when the link 180 is lifted, oscillation will occur as described previously.

Another activity that is taking place at this time results from the action of the cam 220 upon the link 204. As the shaft 70 is rotated in the counter clockwise direction, the cam is rotated so that it loses engagement with the link 204. With this occurring, the tension spring 222 causes the link 204 to pivot about the pin 202 in a counter clockwise direction and the first leg 206 will press the leaf springs 212,218 between it and the vertically extending portion of the stanchion 200. With this occurring, the base 50 becomes locked once more to the frame.

All of the movements described heretofore are in response to the presence of the one way bearing 74 that allows the shaft to be uneffected by drive of the pulley 72 when the motor is rotated in a first direction, but allows drive of the shaft 70 when the pulley is driven in the opposite direction so that the cams 138,140,170 and 220 are driven thereby. In addition, one way bearing 80 allows the pulley 78 to be rotated by the pulley 72 when the latter is driven in the first direction, but provides for free wheeling of the pulley 78 when the pulley 72 is driven in the second rotational direction. The final element in the design is the presence of the spring 160 that will return the shaft, and all its components, to the original position after the motor is disabled.

Figure 14:
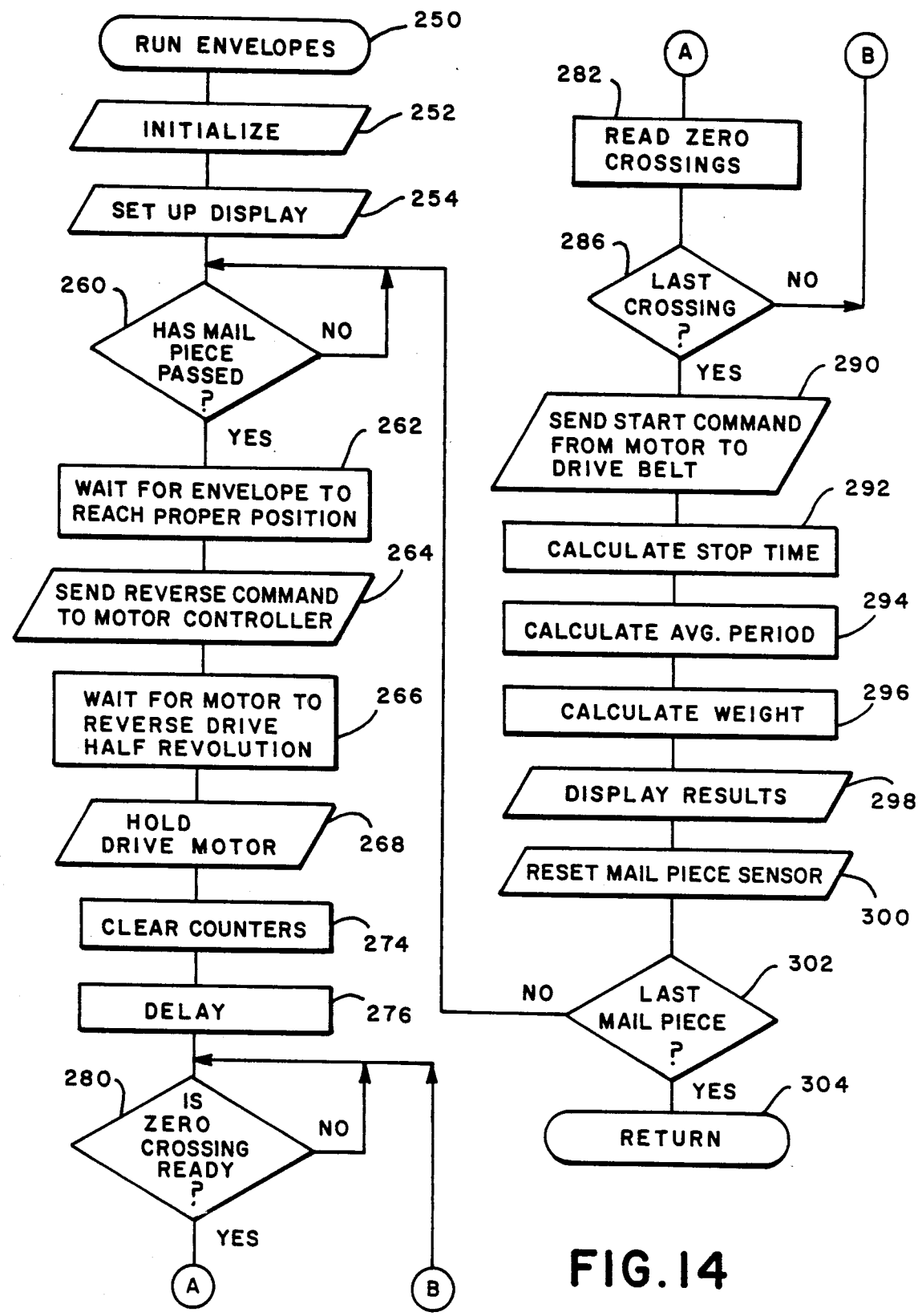

The flow chart of FIG. 14 describes the overall operation of the weighing scale 12. Mail pieces are conveyed 250 across the tray 40 and the electronic system is initialized 252. The display is set up 254 and an inquiry made whether the first mail piece has passed 260. If the first mail piece has passed, the system waits for the envelope to reach a proper position 252. Upon the envelope reaching its proper position, a reverse command signal is sent to the motor controller 264. The system waits for the motor to drive half a revolution and the motor is shut down 268. At this point the start time is stored 270, which is followed by delay 272. The counters are clear 274 and, again, followed by a delay 276. The zero crossings are cleared 278 and an inquiry made if the crossings are ready 280. If yes, the crossing ready bit is cleared 282, and the zero crossing is enabled 284. An inquiry is made as to whether this is the last zero crossing 286, if not, the sequence of crossing ready is repeated, but if so, the weight of the envelope is determined. After the weight of the envelope is determined, the motor is start to run the envelopes once more, and the results displayed 298. The mail piece sensor is reset 300, an inquiry is made is whether this is the last mail piece. If it is not the last mail piece, then the process of weighing is repeated once more.

Using the method described above, one is able to obtain quite accurate determinations of the mass of articles placed upon the tray 40 The accuracy is better than 1/32 of an ounce for mail pieces up to 32 ounces. Not only does one obtain an extremely accurate measurement of the mass, but it can be done in a rapid fashion. It has been found that a single mail piece 112 in a stream of mail pieces can be transported onto the tray 40, stopped, weighed and ejected in about 325 milliseconds. Overlapping entry of the next mail piece 112 simultaneously with ejection of the preceding one provides for weighing at the rate of 184 mail pieces per minute. This represents a significant advance in the weighing of articles in terms of cost, performance and simplicity of electronics over prior weighing devices

What is claimed is:

1. A weighing scale comprising:
a frame,
a base,
at least one spring connecting said base to said frame,
a shaft rotatably supported by said frame,
an article supporting tray,
at least one flexible member connecting said tray to said base,
a transducer attached to said flexible member,
means for conveying articles upon said tray,
a motor,
a pulley disposed upon said shaft,
belt providing drive between said motor and said pulley, and
drive means connecting said conveying means to said shaft whereby upon rotation of said shaft said conveying means is enabled.

2. The weighing scale of claim 1 including a computer in communication with said transducer for receiving the output of said transducer and determining the weight of an object on said tray.

3. A weighing scale comprising:
a frame,
a base,
isolation means connecting said base to said frame,
a shaft rotatably supported by said frame,
an article supporting tray having a projecting member,
an article conveyor supported by said tray,
at least one flexible member connecting said tray to said base,
a transducer attached to said flexible member,
a motor,
a first pulley disposed upon said shaft,
a belt providing drive between said motor and said pulley,
a cam mounted on said shaft,
a link supported by said base, and being engageable with said projecting member, said link having a cam follower in engagement with said cam,
whereby, upon rotation of said shaft said link will coact with said projecting member to cause oscillation of said tray.

4. The weighing scale of claim 3 wherein said cam has an opening therein with contoured surfaces and said cam follower is received within said opening.

5. The weighing scale of claim 4 including a spring supported by said frame and in engagement with said shaft to urge said shaft in said second rotational direction.

6. A vibrating tray weighing scale having a frame, a base attached to the frame by isolation springs, a tray connected to the base by flexure members, a transducer operatively connected to a flexure member to generate a voltage responsive to the degree of flexuring of the flexure member, conveying mechanism for transporting an object to be weighed onto and off of the tray, a mechanism for vibrating the tray, and a computing device for determining the weight of the article of the tray in response to the voltage generated by the transducer, the improvement comprising: said tray having an opening therein, said conveying mechanism including at least one arm having at one end thereof a roller and arcuate skis disposed on each side of said roller.

7. The vibrating tray scale of claim 6 including idler rollers supported by said base and means for moving said idler rollers into and out of said tray opening, said at least one arm being engageable with said idler rollers when said idle rollers are within said opening and said skis being engageable with said tray when said idler rollers are out of said opening.

8. A weighing scale comprising:
a frame,
a base,
a plurality of springs connecting said base to said frame,
a shaft rotatably supported by said frame,
an article supporting tray having an opening therein,
a plurality of flexible members connecting said tray to said base,
a transducer attached to one of said flexible members,
a motor in driving engagement with said shaft,
a cam mounted on said shaft, and
at least one link rotatably supported by said frame, said link being in engagement with said cam, and
a plurality of idler rollers movably supported by said base and engageable with said link whereby upon rotation of said shaft, said cam will act upon said link to cause said link to move said idler rollers into and out of said tray opening.

9. The weighing scale of claim 8 including conveying means supported by said tray and engageable with said idler rollers when said idler rollers are located within said tray opening.

* * * * *